(12) United States Patent
Casey (10) Patent No.: US 7,937,690 B2
(45) Date of Patent: May 3, 2011

(54) EVALUATING PERFORMANCE OF SOFTWARE APPLICATION

(75) Inventor: William L. Casey, Flower Mound, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1380 days.

(21) Appl. No.: 11/439,457

(22) Filed: May 23, 2006

(65) Prior Publication Data

US 2007/0277155 A1   Nov. 29, 2007

(51) Int. Cl.
G06F 9/44       (2006.01)
G06F 15/173   (2006.01)
G06F 11/00     (2006.01)

(52) U.S. Cl. ........ 717/128; 717/127; 717/131; 709/224; 714/47

(58) Field of Classification Search .................... 717/131
See application file for complete search history.

(56) References Cited

U.S. PATENT DOCUMENTS

| | | | | |
|---|---|---|---|---|
| 6,651,243 B1* | 11/2003 | Berry et al. | ................. | 717/130 |
| 6,748,555 B1 | 6/2004 | Teegan et al. | | |
| 6,751,789 B1* | 6/2004 | Berry et al. | ................. | 717/130 |
| 6,792,460 B2* | 9/2004 | Oulu et al. | ................. | 709/224 |
| 7,058,928 B2* | 6/2006 | Wygodny et al. | ............ | 717/128 |
| 7,076,695 B2* | 7/2006 | McGee et al. | ................. | 714/47 |
| 7,367,025 B1* | 4/2008 | Nikolov et al. | ............... | 717/158 |
| 7,506,314 B2* | 3/2009 | Kollmann et al. | ............ | 717/128 |
| 7,581,211 B2* | 8/2009 | Babineau et al. | ............ | 717/131 |
| 2002/0174421 A1* | 11/2002 | Zhao et al. | ................. | 717/174 |
| 2003/0046667 A1 | 3/2003 | Strait et al. | ................. | 717/130 |
| 2004/0078691 A1* | 4/2004 | Cirne et al. | ................. | 714/38 |
| 2004/0205723 A1* | 10/2004 | Juan et al. | ................. | 717/124 |
| 2005/0132041 A1* | 6/2005 | Kundu | ......................... | 709/224 |
| 2005/0223365 A1* | 10/2005 | Smith et al. | ................. | 717/128 |
| 2005/0223366 A1* | 10/2005 | Smith et al. | ................. | 717/128 |
| 2005/0223367 A1* | 10/2005 | Smith et al. | ................. | 717/128 |
| 2005/0223368 A1* | 10/2005 | Smith et al. | ................. | 717/128 |
| 2005/0240904 A1* | 10/2005 | Isakov et al. | ................. | 717/128 |
| 2005/0251792 A1* | 11/2005 | Smith | ......................... | 717/131 |

(Continued)

FOREIGN PATENT DOCUMENTS

WO   WO 03/090085 A2   10/2003
WO   WO-A-03/090085    10/2003

OTHER PUBLICATIONS

PCT International Search Report, PCT/US2007/007471, Mar. 27, 2008, pp. 1-3.

(Continued)

*Primary Examiner* — Tuan Q Dam
*Assistant Examiner* — Marina Lee (57) ABSTRACT

A method of evaluating software application performance includes receiving, in an evaluation module in a computer system and from an application program: 1) a first call indicating that execution begins of a predefined portion of the application program, and then 2) a second call indicating that the execution of the predefined portion ends, the evaluation module being configured to receive similar calls from any of several application programs in the computer system. It is determined, in configuration information for the application program that is available to the evaluation module, whether a duration time between the first and second calls exceeds a predefined time specified in the configuration information. Upon determining that the duration time exceeds the predefined time, a message is forwarded from the evaluation module to a recipient, the message and the recipient being specified in the configuration information. Configuration information may specify performance of tracing or usage tracking.

18 Claims, 4 Drawing Sheets

U.S. PATENT DOCUMENTS

| | | | | |
|---|---|---|---|---|
| 2006/0015853 | A1* | 1/2006 | Babineau et al. | 717/127 |
| 2006/0156072 | A1* | 7/2006 | Khot et al. | 714/47 |
| 2006/0242627 | A1* | 10/2006 | Wygodny et al. | 717/128 |
| 2007/0006165 | A1* | 1/2007 | Lam et al. | 717/128 |
| 2008/0126413 | A1* | 5/2008 | Addleman et al. | 707/104.1 |

OTHER PUBLICATIONS

PCT Written Opinion of the International Searching Authority, PCT/US2007/007471, Mar. 27, 2008, pp. 1-5.

"Microsoft Enterprise Instrumentation Framework" [online]. Microsoft Corporation 2006, [retrieved on May 23, 2006]. Retrieved from the Internet: <URL: http://www.microsoft.com/downloads/deatails.aspx?familyid=80DF04BC-267D-4919-8BB...>.

"How To: Use EIF" [online]. Microsoft Corporation 2006 [retrieved on May 23, 2006]. Retrieved from the Internet: <URL: http://msdn.microsoft.com/library/en-us/dnpag/html/scalenethowto14.asp?frame=true>.

* cited by examiner

```
<monitoringParameters>
    <entry nameToMonitor="*" usageOn="false"
        traceOn="false" thresholdError="-1" thresholdWarning="-1" />
    <entry nameToMonitor="*.aspx" usageOn="true"
        traceOn="false" thresholdError="1.5" thresholdWarning="1.0" />
    <entry nameToMonitor="TestFolder//WebPage1.aspx" usageOn="true"
        traceOn="false" " thresholdError="2.5" thresholdWarning="1.5" />
</monitoringParameters>
```

EVALUATING PERFORMANCE OF SOFTWARE APPLICATION

TECHNICAL FIELD

The description relates to evaluating the performance of a software application.

BACKGROUND

The performance of computer systems is of great importance to their owners, administrators and users. Such systems often include a number of independent components that are expected to interact with each other in predefined ways. To a user, much of these interactions may be transparent, but they are nevertheless essential to perform the requested operations and accomplish the desired results.

It is therefore a disadvantage when the computer system does not work as intended, because this slows down the users' work, may consume unnecessary system resources, and could have other consequences as well. The computer system is often tended to by expert staff to detect such issues and try to eliminate them or at least minimize their impact. There are also so-called help desks where users can report problems they have experienced and get help.

One aspect of addressing unexpected behavior in a system is to determine what component or aspect of the system is causing the malfunction. Often, there are a number of potential causes in the system that could be responsible for the symptom noticed by the user. It is therefore important to be able to localize the problem before attempting to resolve it. Existing techniques for this include tracing of the application execution and of the calls being made in the system.

Another aspect is to detect the errant behavior at an early stage. An application that has an error may exhibit gradually worse behavior over time, while continuing to perform the requested tasks, at least in principle. One example of such a gradually aggravated condition is the time for executing a specific routine. If there is a problem in the system, the application may successively require more and more time to perform the task, until it perhaps ceases to function entirely at some point. While the delay may be noticeable to the end user, it may not be significant enough (at first) to warrant a help center call, or the user may mistakenly attribute the slowness to another resource that is known to cause delays from time to time.

SUMMARY

The present description relates to evaluating performance of an application program. Generally, an application program is described to generate start and stop calls when the execution of a predetermined portion thereof begins and ends, respectively. The start and stop information is evaluated using a configuration setting that is separate from the application program. For example, the configuration setting prescribes that error or warning messages be issued based on the duration of the start/stop interval, and can specify whether tracing or usage tracking is to be performed.

In a first general aspect, a method of evaluating performance of a software application includes receiving, in an evaluation module in a computer system and from an application program: 1) a first call indicating that execution begins of a predefined portion of the application program, and then 2) a second call indicating that the execution of the predefined portion ends, the evaluation module being configured to receive similar calls from any of several application programs in the computer system. It is determined, in configuration information for the application program that is available to the evaluation module, whether a duration time between the first and second calls exceeds a predefined time specified in the configuration information. The method further includes, upon determining that the duration time exceeds the predefined time, forwarding a message from the evaluation module to a recipient, the message and the recipient being specified in the configuration information.

Implementations may include any or all of the following features. The configuration information may specify several predefined times associated with respective messages, and one of the messages may correspond to a longest one of the several predefined times that has been exceeded is forwarded to the recipient. The method may further include determining whether the configuration information specifies that usage tracking of the execution is to be performed, and initiating the usage tracking when so specified. The usage tracking may include capturing metrics as to who is using the predefined portion of the application program. The method may further include determining, in response to the first call, whether the configuration information specifies that tracing of the execution is to be performed, further comprising initiating tracing, when so specified, and terminating the tracing after the second call. The starting and terminating of the tracing, respectively, may be performed by causing a message distributor to forward a trace message. The method may further include generating a log message in response to the first and second calls, the log message being generated also when it is determined that the duration time does not exceed the predefined time. The log message may specify the start and end of the execution. The log message may specify a usage relating to the execution. The configuration information may include: a first setting specifying whether to generate a usage log; a second setting specifying whether to generate a trace log; and a third setting specifying at least the predefined time. The configuration information may include settings associated with respective portions of the application program having different granularity, and a most granular of the settings that applies to the first and second calls may be applied in the determination. The several application programs may have been adapted to make the first and second calls, the adaptation comprising executable code that is identical in all of the several application programs. The predefined portion of the application program may be at least one selected from the group consisting of: an application portion, a method, a web page, a web service, and combinations thereof.

In a second general aspect, a computer system for evaluating performance of a software application includes several application programs, at least one of which is configured to make: 1) a first call indicating that execution begins of a predefined portion of the application program, and then 2) a second call indicating that the execution of the predefined portion ends. Configuration information is stored in the computer system, the configuration information specifying at least a message and at least a recipient associated with the at least one application program. The system includes an evaluation module configured to receive the first and second calls from any of the several application programs, the evaluation module determining, after receiving the second call and for the at least one application program, whether a duration time between the first and second calls exceeds a predefined time specified in the configuration information.

Implementations may include any or all of the following features. The evaluation module may further determines whether the configuration information specifies that usage tracking of the execution is to be performed, and initiate the usage tracking when so specified. The configuration information may further specify that tracing of the execution is to be performed, and the evaluation module may initiate the tracing after the first call and terminates the tracing after the second call by causing a message distributor to forward a trace message. The several application programs may have been adapted to make the first and second calls, the adaptation comprising executable code that is identical in all of the several application programs. The configuration information may further include: a first setting specifying whether to generate a usage log; and a second setting specifying whether to generate a trace log. The configuration information may include settings associated with respective portions of the application program having different granularity, and the evaluation module may apply a most granular of the settings that applies to the first and second calls.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
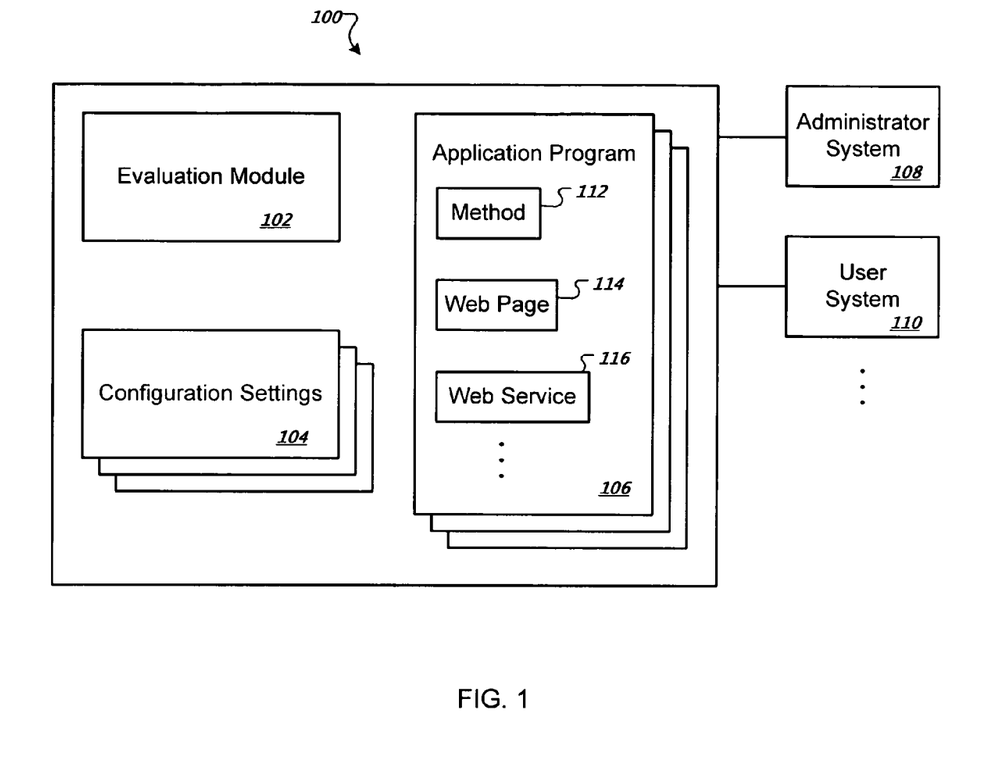
FIG. 1 is a block diagram of a system for executing a software application and evaluating performance thereof.

FIG. 1 is a block diagram of a system 100 for executing a software application and evaluating performance thereof. The system 100 includes an evaluation module 102, configuration settings 104, and components included in one or more applications 106 the execution of which is to be evaluated. An administrator system 108 and one or more user systems 110 may interact with the system 100.

The system 100 may be used to monitor applications 106, such as databases, Java applications, etc. that a user can initiate and interact with through the system 110. Furthermore, whole applications or portions of the application, such as methods 112 used in object-oriented programming, may be monitored. Other items that may be monitored could include the serving or retrieval of web pages 114 or groups of applications working in concert to provide a web service 116. Web services may exist that perform user authentication and authorization, perform financial calculations, allow retrieval of employee data, allow retrieval of corporate financial and sales data, etc., to name a few examples. There can then be constructed applications, or other web services, that make calls to the web services instead of having this functionality duplicated in the application.

The system 100 may be used in an effort to provide an early indication of slowness or failure among monitored applications. This early warning may allow administrators using the system 108 to intervene before the monitored application experiences total failure and thereby interrupts activities of users that work with the system 110. In the event the evaluation detects such indication, the system may provide notification of an error to administrators. In the system 100, the specifics of what monitoring is to be performed, the possible response(s) to be sent following the evaluation, and whether monitoring is to be done at all, is transparent to the application program(s) 106. Rather, such definitions are included in the one of the configuration settings 104 that corresponds to the particular application.

Applications 106 have start and stop components incorporated into the source code. Start components are located at the points where monitoring should begin, if so specified by the configuration setting. Likewise, at each location where monitoring should cease, a stop component is introduced. Multiple start and stop components may be used as needed to account for branches in execution of the application code, to provide monitoring at different granularities of the execution, or to provide monitoring for multiple applications or portions thereof.

Start and stop components are integrated into applications 106. For example, in an object oriented development environment, such as Java, instrumentation may be performed by inserting method calls into the application at the appropriate place. The actual way the components would be implemented is dependent on the type and capabilities of the programming language, development framework, programming ideology, etc. used in the creation and or maintenance of the application. Calls to the components may be implemented, for example, by function calls, macros, methods, subroutines, widgets, etc. Other ways of executing the start and stop components may be appropriate for other application development environments such as programming blocks used in National Semiconductor's LabView, etc.

An application 106 instrumented as described above sends signals to an evaluation module 102 whenever a start or stop component is encountered during its execution. The evaluation module then performs the calculation, if any, as specified in a corresponding one of the configuration settings 104. Since the application need not be modified (beyond the inclusion of the start and stop components prior to compilation), the operation of the start and stop components is independent of the configuration settings. Monitoring (or the absence of it) has no effect on the execution of the application besides the start and stop calls being generated.

The performance monitoring system 100 may be used to monitor multiple applications simultaneously. For example, the system may be used to monitor the performance of an application serving a web page 114 while simultaneously monitoring a web service 116. In another instance, the system may be used to monitor a setup that includes a database, Java components and a web server, all of which are simultaneously monitored. Likewise, the system may be used to simultaneously monitor portions of an application such as a specific method 112 or any part of a subroutine including a single statement. This monitoring capability may be used in situations involving large, monolithic applications in which it is desirable to monitor multiple subroutines or other sub-structures. It is also within the capability of the system to simultaneously monitor whole applications, subroutines, sub-structures, etc. in a nested or otherwise fashion.

The administrator system 108 may receive from the performance monitoring system 100 notifications and gathered data about executing applications. To accomplish this, the evaluation module evaluates the start and stop signals sent to it from the respective components of the applications being monitored and takes further action as specified in the configuration setting. The start and stop signals provide timing information which can be used to calculate the length of time used to execute a portion of an application that is bounded by start and stop components. The execution duration may be calculated by the evaluation module by, for example, subtracting a final time from an initial time provided given the start and stop signals, respectively. Alternatively, timing information may be captured as universal time, processor execution cycles or other means and the execution duration calculated accordingly.

The performance monitoring system 100 may take into account the configuration settings 104 specified for each portion of an application under evaluation. Configuration settings may include information specifying which, if any, portions of application(s) to monitor as well as particulars about how they are to be handled. For instance, some settings may specify maximum execution durations, which if exceeded, may cause warning or error notifications to be sent to an administrator system 108. Other settings, for example, may specify whether to save timing information for later analysis.

Some configuration settings may direct whether notifications are enabled or disabled while other parameters may indicate that tracing or tracking of usage should occur. For instance, when tracking is enabled, timing information may be sent to a data warehouse to track an application's execution that is used to show contractual obligations are met (e.g. guaranteed response times for loading a web page) or to gather billing information (e.g. information used to bill a customer for time spent using an application). In another instance, tracing may be enabled to aid an administrator in determining execution sequence when trouble shooting or optimizing an application. For example, an administrator may use tracing to determine which portion of a slow, combined application involving a database, Java program, and web server is responsible for the delay.

The configuration settings may be implemented, for example, with a configuration file that includes rules for evaluating applications. In this example, the evaluation module 102 could, for instance, parse the configuration file to determine the desired configuration. Rules may configure how warnings and error notifications are triggered or whether tracking or tracing is enabled. In addition, various interfaces may be used by the administrators to manage the system, including for example, web interfaces, console applications, Java widgets, remote procedure calls, etc.

Tracking or tracing may be turned on or off at any time by revising the configuration settings, since the applications being monitored send out the start and stop signals regardless of the configuration. When a rule in the configuration is met, an action takes place, such as sending a notification to an administrator when a warning threshold is exceeded or making an addition to a trace log when a start component executes. Other options may be available, such as performing a trace for a specified number of steps, amount of time, until a specified condition is met, or other needs may exist. For example, rules to create logs with information about multiple applications may be created to aid an administrator in determining the interactions between applications. A variety of types of information can be included in the logs. In some implementations, information can later be added to the logs, such as notes from the operator if a trouble ticket was created. Also, data collected for tracing or tracking may be recorded and stored, such as in a data warehouse, for off-line processing.

Figure 2:
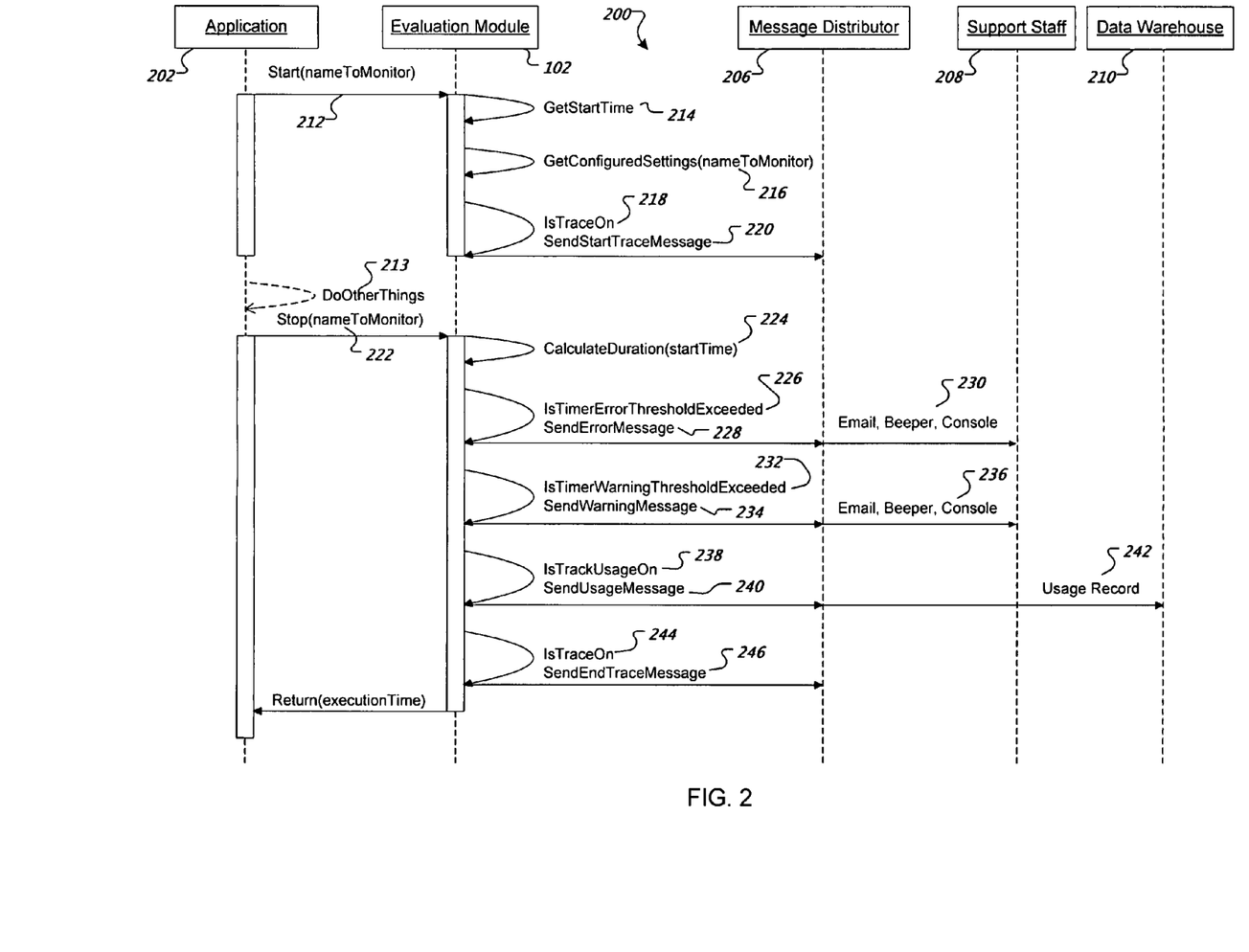
FIG. 2 is a diagram that illustrates a process sequence for evaluating the performance of a software application.

FIG. 2 is a diagram that illustrates a process sequence 200 for evaluating the performance of a software application. Entities such as processes, people, etc. are depicted as boxes at the top of the figure (e.g. Application 202) with vertical dashed lines depicting their activities as parallel timelines initially starting near the top of the figure and proceeding downward. Ongoing activities or states are represented by boxes on the dashed lines. Arrows between timelines represent events occurring in one entity triggering actions in another, while arrows within a single timeline represent serially dependent activities.

The process sequence 200 includes an example sequence of actions performed by a performance monitoring system while the application 202 is being monitored. In this example, the application 202 sends signals to the evaluation module 102. The evaluation module 102 can send messages to a message distributor 206 which can send information to support staff 208 and a data warehouse 210.

In this example, the application 202 is being executed when a start component is reached. Once the start component is reached, a corresponding signal is sent 212 to the evaluation module 102 and the application 202 continues to execute 213. To indicate which monitored portion has been reached, a name may be given for the portion being monitored (i.e. nameToMonitor) and this identifier may be forwarded to the evaluation module 102. In other implementations, such as those involving a .Net environment, the evaluation module 102 can directly determine the caller identity (i.e., the nameToMonitor). In such implementations, the signal may not identify the monitored portion. As another example, the identity can be directly determined without receiving the identifier in implementations using a Java environment, but for performance reasons it may nevertheless be included there.

When the evaluation module 102 receives the signal, it determines the starting time 214 and determines 216 which, if any, configuration settings apply to the named portion. The evaluation module determines whether trace functionality is specified in the configuration 218 and, if so, sends a signal 220 to the message distributor 206 to indicate that an entry should be made in a trace log.

When the application 202 encounters a stop component, a corresponding signal is sent 222 with the corresponding nameToMonitor to the evaluation module 102 and the application 202 may continue execution. When the evaluation module receives the signal, it calculates the elapsed time 224 by for instance, subtracting the above start time from the current time. The evaluation module also determines whether an error threshold from the configuration settings was exceeded 226. In the event that the duration surpasses the specified threshold, a signal is sent 228 to the message distributor 206 indicating that it should send a notification 230 to the support staff 208. The notification 230 may be in the form of an email, beeper, console message, etc. The evaluation module 102 may also determine 232 whether the elapsed time has surpassed a warning threshold specified in the configuration. If so, a signal to send an error notification is passed 234 to the message distributor 206 which in turn sends a notification 230 to the support staff 208, possibly in the form of an email, beeper message, etc. It should be noted that the system may be implemented such that redundant messages (e.g. both warning and error messages for the same start and stop interval) may be avoided, for example, by sending a single, combined message or, as another example, by not sending the less severe message to the support staff when a more severe one is being sent. Other notification practices may be implemented such as limiting the number of notifications sent for a particular named portion within a given time (e.g. sending a single notification per every 10 minutes for an named portion that causes warnings to be generated once per second).

The evaluation module 102 also determines 238 whether usage tracking is specified in the configuration. If so, information such as the application name, user name, start time, stop time, duration, etc. is passed 242 to the data warehouse 210 where it may be stored in a usage record for processing offline. Possible uses may include determining whether contractual obligations have been met (e.g. mean response time of less than 1.5 seconds for serving web pages) or gathering information for billing users of an application (e.g. talk time in a communications application). Other possible uses may be administrative tasks such as determining performance bottlenecks, peak operating times, or reconstructing a sequence of events leading up to a failure, similar to an aircraft flight data recorder. Moreover, the evaluation module 102 checks 244 the configuration to see whether it requests a trace for the named portion 202. If so, a signal is passed 246 to the message distributor indicating that a stop entry should be made in the trace log.

In this example the actions of the entities are described as occurring in parallel. In other implementations their actions may be organized in a more serial fashion arranged in a different order, or even have some of the steps omitted with others possibly added. For example, the application and evaluation modules may be constructed such that execution of the application halts during processing of the evaluation module, as may be found in a preemptive environment. In another example, support staff may choose to omit warnings or add a second tier of warnings before an error is issued.

Figure 3:
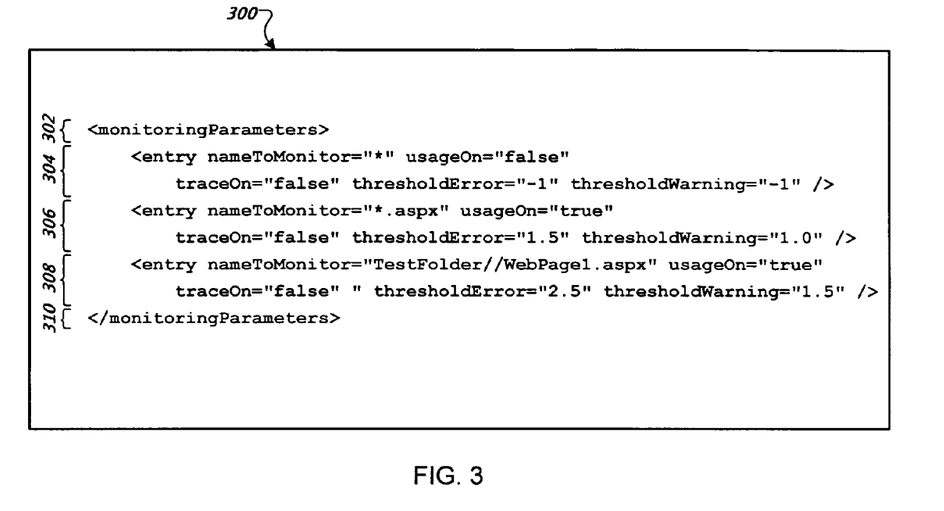
FIG. 3 is an example of an XML configuration setting for a system that evaluates the performance of a software application.

FIG. 3 is an example of an XML configuration setting 300 for a system that evaluates the performance of a software application. For example, any of the configuration settings 104 may include the stetting 300. The first item 302 is an opening tag used to mark the beginning of a section of monitoring parameters. It consists of a keyword enclosed by delimiters and signals the starting of a section. It begins a listing of rules that are also encapsulated with delimiters and begin with the word "entry", such as those shown by 304, 306, and 308. The last item 310 in the file is a closing tag used to mark the end of the section of monitoring parameters. It is similar to the opening tag 302, but with a backslash preceding the keyword and signals the end of the section. Constructs such as these allow the specification of the monitoring rules to be, for instance, included as a section within a file which could, for example, include information other than that used for configuration. For example, the content shown in FIG. 3 may represent a portion of a file that also includes information used by other aspects of the system such as GUI defaults or file locations.

Rules, such as 304, 306, and 308, determine how the system handles one or more applications being monitored. The rules include fields that determine how various aspects of the system may be configured. Included in the rules shown in FIG. 3 are fields for application portion names to match, flags for usage tracking and tracing, and threshold values for triggering error and warning notifications. Values for the name fields may contain text or wildcard characters to allow a rule to match multiple named portions; for example, "*" matches a set of any characters. Tracking and tracing flags are Booleans and are set to true or false. Thresholds for errors and warnings are defined as either −1 or a non-negative number corresponding to the duration, which if surpassed, causes a notification to be sent. Time units are not shown in the FIG. 3; they may be milliseconds, seconds, processor cycles, etc.

The first rule 304 has its name field, i.e. "nameToMonitor", specified with a single asterisk that is a wildcard that matches all possible portions being monitored, indicating that the rule will be applied to any portion which does not have a closer match with another rule. The first rule's usage flag, "usageOn", and trace flag, "traceOn", are both set to false, indicating that neither usage tracking nor tracing will be done for portions that have this rule applied. Threshold values for error notification, "thresholdError", and warning notification, "thresholdwarning" are both set to "−1", indicating notifications should not be sent because the duration of a start/stop interval will not be a negative number.

The second rule 306 has its "nameToMonitor" value set to "*.aspx". The wildcard combined with the text ".aspx" matches any named portion which end in ".aspx". The "usageOn" flag is set to true, indicating that usage will be tracked, for example as described by above, by sending information to a data warehouse. The "traceOn" flag is set to false, indicating that tracing will not be performed. The error threshold field, "thresholdError", has a value of 1.5, indicating that when the time period between the start and stop components exceeds 1.5 time units, an Error notification will be sent. The warning threshold field, "thresholdWarning", has a value of 1.0, indicating that when the duration between the start and stop components is more than 1.0, a warning notification will be sent.

To illustrate how the rule is applied, consider two example cases: an application portion named "foo.aspx" and a second application portion named "foo.exe". In the case of "foo.aspx", both rules match the portion name; the single asterisk matches the whole portion name in the first rule 304 while the asterisk matches "foo" in the second rule 306 (".aspx" matches ".aspx"). Since the "nameToMonitor" value is more restrictive in the second rule 306 by requiring a specific name ending, the second rule more closely matches "foo.aspx" than the first rule, thus causing the second rule but not the first rule to be applied. In the second case, "foo.exe" also matches the first rule, but does not match the second rule 306; in this case the first rule would be invoked (unless a better match was found elsewhere).

The third rule 308 has a name field, "nameToMonitor", which does not include any wildcards. This indicates that the rule will be applied only to a portion with the name "TestFolder//WebPage1.aspx". For this portion, the usage flag indicates usage will be tracked and the tracing flag indicates tracing should not be performed. The error threshold is set to cause a notification if the start-to-stop duration exceeds 2.5 time units and the warning threshold is set to cause a notification for durations that exceed 1.5 time units.

XML is one way that configuration information may be specified for the system; other ways such as text files, database entrees, binary formats, etc. are other possibilities for specifying and using configuration information. Portion names may be specified uniquely or redundantly as desired to monitor groups of applications (e.g. all human resource applications), single applications, or parts thereof. In other variations, the system may allow multiple rules to be applied to an application at a time, such as applying the most restrictive/least restrictive rules which match, or the system may permit different types of rules that depend, on whether the portion name refers to a group of applications, subroutines, etc.

Figure 4:
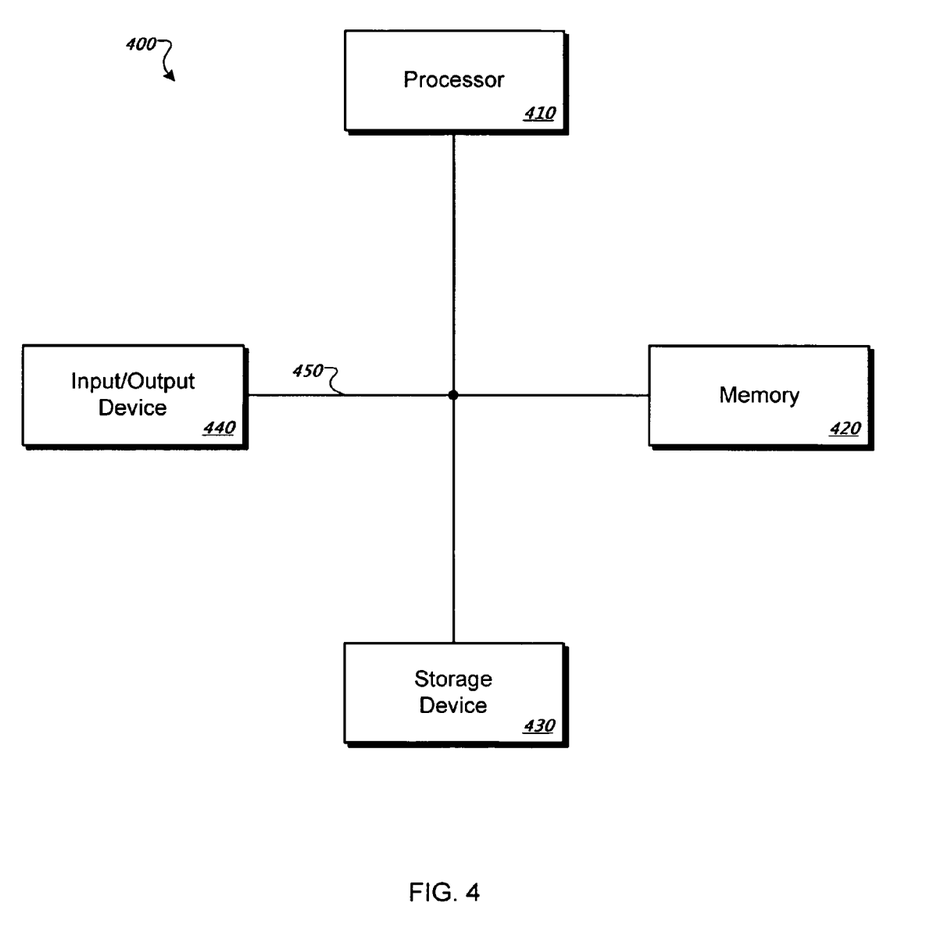
FIG. 4 is a block diagram of a general computer system.

FIG. 4 is a block diagram of a computer system 400 that can be used in the operations described above, according to one embodiment. For example, the system 400 may be included in the system 100.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one embodiment, the processor 410 is a single-threaded processor. In another embodiment, the processor 410 is a multi-threaded processor. The processor 410 is capable of processing instructions stored in the memory 420 or on the storage device 430 to display graphical information for a user interface on the input/output device 440.

The memory 420 stores information within the system 400. In one embodiment, the memory 420 is a computer-readable medium. In one embodiment, the memory 420 is a volatile memory unit. In another embodiment, the memory 420 is a non-volatile memory unit.

The storage device 430 is capable of providing mass storage for the system 400. In one embodiment, the storage device 430 is a computer-readable medium. In various different embodiments, the storage device 430 may be a floppy disk device, a hard disk device, an optical disk device, or a tape device.

The input/output device 440 provides input/output operations for the system 400. In one embodiment, the input/output device 440 includes a keyboard and/or pointing device. In one embodiment, the input/output device 440 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of evaluating performance of a software application, the method comprising:
   receiving, in an evaluation module in a computer system and from an application program: 1) a first call indicating that execution begins of a predefined portion of the application program, and then 2) a second call indicating that the execution of the predefined portion ends, the evaluation module being configured to receive similar calls from any of several application programs in the computer system;
   determining, in configuration information for the application program that is available to the evaluation module, whether a duration time between the first and second calls exceeds a predefined time specified in the configuration information; and
   upon determining that the duration time exceeds the predefined time, forwarding a message from the evaluation module to a recipient, the message and the recipient being specified in the configuration information;
   wherein the configuration information includes settings associated with respective portions of the application program having different granularity, wherein more granular settings more selectively identify portions of the application program to which the settings apply than do less granular settings, and wherein a most granular of the settings that applies to the first and second calls is applied in the determining.

2. The method of claim 1, wherein the configuration information specifies several predefined times associated with respective messages, and wherein one of the messages corresponding to a longest one of the several predefined times that has been exceeded is forwarded to the recipient.

3. The method of claim 1, further comprising determining whether the configuration information specifies that usage tracking of the execution is to be performed, further comprising initiating the usage tracking when so specified.

4. The method of claim 3, wherein the usage tracking comprises capturing metrics as to who is using the predefined portion of the application program.

5. The method of claim 1, further comprising determining, in response to the first call, whether the configuration information specifies that tracing of the execution is to be performed, further comprising initiating tracing, when so specified, and terminating the tracing after the second call.

6. The method of claim 5, wherein the starting and terminating of the tracing, respectively, are performed by causing a message distributor to forward a trace message.

7. The method of claim 1, further comprising generating a log message in response to the first and second calls, the log message being generated also when it is determined that the duration time does not exceed the predefined time.

8. The method of claim 7, wherein the log message specifies the start and end of the execution.

9. The method of claim 7, wherein the log message specifies a usage relating to the execution.

10. The method of claim 1, wherein the configuration information includes:
   a first setting specifying whether to generate a usage log;
   a second setting specifying whether to generate a trace log; and
   a third setting specifying at least the predefined time.

11. The method of claim 1, wherein the several application programs have been adapted to make the first and second calls, the adaptation comprising executable code that is identical in all of the several application programs.

12. The method of claim 1, wherein the predefined portion of the application program is at least one selected from the group consisting of: an application portion, a method, a web page, a web service, and combinations thereof.

13. A computer program product tangibly embodied in a non-transitory computer-readable medium, the computer program product including instructions that, when executed, cause a processor to perform operations comprising:
   receiving, in an evaluation module in a computer system and from an application program: 1) a first call indicating that execution begins of a predefined portion of the application program, and then 2) a second call indicating that the execution of the predefined portion ends, the evaluation module being configured to receive similar calls from any of several application programs in the computer system;
   determining, in configuration information for the application program that is available to the evaluation module, whether a duration time between the first and second calls exceeds a predefined time specified in the configuration information; and
   upon determining that the duration time exceeds the predefined time, forwarding a message from the evaluation module to a recipient, the message and the recipient being specified in the configuration information;
   wherein the configuration information includes settings associated with respective portions of the application program having different granularity, wherein more granular settings more selectively identify portions of the application program to which the settings apply than do less granular settings, and wherein the evaluation module applies a most granular of the settings that applies to the first and second calls.

14. A computer system for evaluating performance of a software application, the computer system comprising:
   a processor;
   several application programs, executable by the processor, at least one of which is configured to make: 1) a first call indicating that execution begins of a predefined portion of the application program, and then 2) a second call indicating that the execution of the predefined portion ends;
   configuration information stored in the computer system, the configuration information specifying at least a message and at least a recipient associated with the at least one application program; and
   an evaluation module, executable by the processor, configured to receive the first and second calls from any of the several application programs, the evaluation module determining, after receiving the second call and for the at least one application program, whether a duration time between the first and second calls exceeds a predefined time specified in the configuration information;
   wherein the configuration information includes settings associated with respective portions of the application program having different granularity, wherein more granular settings more selectively identify portions of the application program to which the settings apply than do less granular settings, and wherein the evaluation module applies a most granular of the settings that applies to the first and second calls.

15. The computer system of claim 14, wherein the evaluation module further determines whether the configuration information specifies that usage tracking of the execution is to be performed, and initiates the usage tracking when so specified.

16. The computer system of claim 14, wherein the configuration information further specifies that tracing of the execution is to be performed, and wherein the evaluation module initiates the tracing after the first call and terminates the tracing after the second call by causing a message distributor to forward a trace message.

17. The computer system of claim 14, wherein the several application programs have been adapted to make the first and second calls, the adaptation comprising executable code that is identical in all of the several application programs.

18. The computer system of claim 14, wherein the configuration information further includes:
   a first setting specifying whether to generate a usage log; and
   a second setting specifying whether to generate a trace log.

* * * * *